Oct. 19, 1926.
C. RUESENBERG
FRICTION CLUTCH
Filed Oct. 12, 1925
1,603,295
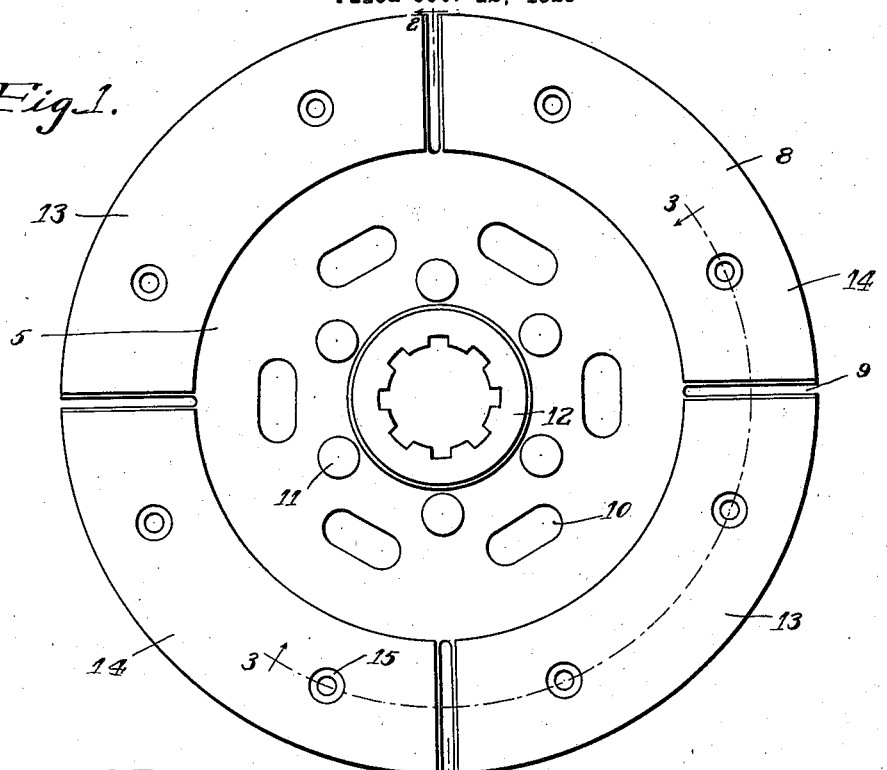
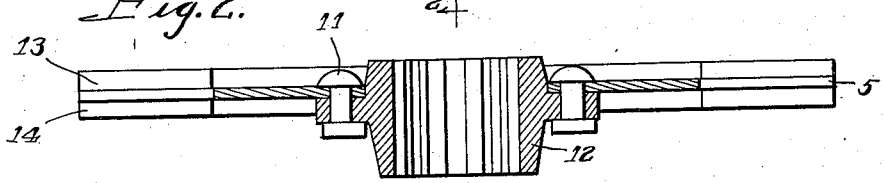
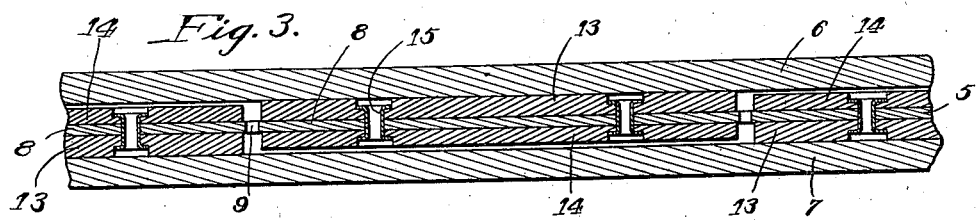
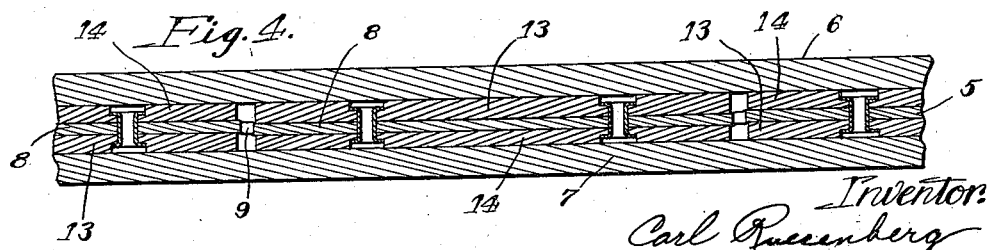

Patented Oct. 19, 1926.

1,603,295

UNITED STATES PATENT OFFICE.

CARL RUESENBERG, OF ROCKFORD, ILLINOIS, ASSIGNOR TO ROCKFORD DRILLING MACHINE COMPANY, OF ROCKFORD, ILLINOIS, A CORPORATION OF ILLINOIS.

FRICTION CLUTCH.

Application filed October 12, 1925. Serial No. 61,932.

This invention relates to friction clutches of the disk type and more particularly to such clutches designed to be suited especially to the requirements of motor vehicles.

Clutches of the kind referred to have been provided having a driven clutch disk which secured cushioned engagement and consequently gradual power take-up by being flexed or distorted. In one form, these disks were stamped to provide an undulated rim portion bearing friction pads to distort the disk upon the application of pressure from a driving element for a power take-up. This type of disk has been found impractical and unsatisfactory for the reason that the metal, having been placed under an initial strain, quite readily fatigues and after a time does not possess the required inherent resilience to resume the normal undulated form on disengagement of the clutch and, as a consequence, there is no gradual power take-up and the clutch will grab and chatter. Clutch disks of the type referred to have also ben provided where a flat rim portion was slotted radially at regular intervals with friction pads mounted alternately on opposite faces of the disk on the sectors formed between the slots. The sectors were intended to have the desired resilience to provide a gradual power take-up and on the release of the clutch to resume the normal flat undistorted shape. However, there was nothing to limit the extent of the flexing of the sectors by the action of the pads when pressure was applied to the pads in opposite directions by the driving elements and frequently the sectors came in direct contact with the driving elements, resulting in scraping and, of course, in noisy and inefficient power transmission. Also the metal after a time fatigued and the sectors were apt to be bent out of alignment thus throwing the clutch out of balance and causing grabbing and chattering because of the inability to secure any further gradual power take-up.

The principal object of the present invention is to avoid, as far as practicable, the objectionable features present in the previous types of friction clutches above described. According to the present invention, a perfectly flat clutch disk is provided having sectors formed about the rim thereof by regularly spaced radial slots entering from the periphery of the disk, the sectors having friction pads of one thickness mounted alternately on opposite faces of said disk, and having a second set of friction pads of less thickness mounted alternately on opposite faces of the disk intermediate the first mentioned pads. This arrangement disposes each of the thinner pads on the opposite face of a sector from a thicker pad. The thinner pads function to limit the possible extent of distortion that may be produced by the action of the thicker pads. At the same time they constitute in effect half of the total available frictional driving surface of the disk so that upon initial engagement of the clutch there is a relatively light partial power take-up due to the engagement of the thicker pads and, after distortion of the disk in the flexing of the sectors thereof in opposite directions by the thicker pads, the thinner pads come into engagement and provide with the thicker pads a full and substantially complete power take-up. By virtue of the fact that the disk is formed perfectly flat so that no strains are set up in the metal thereof at the outset and further because there is only a limited distortion thereof in the operation of the clutch, the disk will always resume its normal undistorted shape upon the release of the clutch and there is every insurance of continuous satisfactory service and much longer life. Furthermore, the resilience of the disk being preserved, there is always a cushioned engagement and consequent gradual power take-up and never a grabbing and chattering of the clutch.

The invention is more fully described in the course of the following specification in which reference is made to the accompanying drawing, wherein—

Figure 1 is a face view of a friction clutch disk made in accordance with my invention;

Fig. 2 is a cross-section taken on the line 2—2 of Fig. 1 looking in the direction of the arrows;

Fig. 3 is a developed section taken on the arcuate line 3—3 of Fig. 1 and showing the relationship of the parts on initial engagement with the driving elements of the clutch; and Fig. 4 is a similar section illustrating the fully engaged condition of the clutch.

Throughout the views, the same reference numerals are applied to corresponding parts.

In friction clutches of the kind mentioned, motion is transmitted from a driving shaft or motor to the driven clutch disk 5 by two oppositely disposed pressure plates 6 and 7 which rotate with the driving shaft and may be brought together under spring pressure or the like by any suitable means, for driving the disk 5 by frictional engagement therewith about its rim portion. The plates 6 and 7 may be regarded as the pressure plate and the web of a fly-wheel in the clutch of a motor vehicle, the web of the fly-wheel ordinarily affording on its rearward side, a flat frictional driving face for power transmission. The rim portion of the disk 5 is divided into quadrant sectors 8 by radial slots or kerfs 9 entering the rim of the disk from the periphery thereof. These slots are preferably struck out of the perfectly flat sheet metal of the disk as are also a number of lightening holes 10 and holes to receive the rivets 11 for securing the disk 5 on a collar 12, arranged to have a splined connection with the driven shaft extending into the gear box.

The sectors 8 have friction pads 13 mounted alternately on opposite sides of adjacent sectors and other friction pads 14 mounted respectively on the opposite side of the disk from the first mentioned pads and arranged intermediate the same. It will be noted that the pads 13 are relatively thick and the pads 14 relatively thin. The arrangement of the pads disposes a thick pad 13 on one side of a sector with a thin pad 14 on the opposite side, the adjacent sector having the reverse arrangement of pads and so on around the disk. It will thus be seen that, in the operation of the clutch, the pads 13 will first come into frictional contact with the plates 6 and 7. In the event there is the slightest irregularity in the thickness of the pads 13, the disk 5 will accommodate such irregularity by its splined connection with the driven shaft. In other words, half of the total available frictional engaging surfaces of the disk will be brought into full engagement with the driving plates on the initial engagement of the clutch. As the pressure plate moves in closer to the fly-wheel, the pads 13 flex the sectors 8 in opposite directions so that there is a cushioned engagement and the plate is distorted more and more in a gradual power take-up. There is a certain amount of possible slippage betwen the pads and the plates so long as only the pads 13 are in engagement. Obviously, the possible slippage decreases as the pressure thereon increases in the flexing of the sectors until the condition arises where the pads 14 come into engagement with the driving plates in the full engagement of the clutch; then the total available frictional engaging surfaces of the clutch are in use and the disk is distorted to its maximum degree. The pads 14 positively limit the distortion of the disk. The sectors of the disk preserve their inherent resilience as the metal cannot take a set when it is not permitted to flex beyond a predetermined extent. As a result, the clutch far outlives previous clutches of a similar type and will never grab or chatter as previous clutches frequently did where the disks had taken a set in their distorted shape. Furthermore, the pads 14 serve to complete a substantially continuous frictional engaging surface on both faces of the disk, as will be noted in Fig. 4. A further advantage in the use of the pads 14 in connection with the pads 13 is that it enables a variation in the design of different clutches to take care of different powered motors by simply varying the possible extent of distortion by a variation in the thickness of the pads 13. Where the pads 13 and 14 are properly proportioned, there is no likelihood of stalling a motor nor, on the other hand, is there a likelihood of slippage, and longer life in a clutch is secured.

The pads 13 and 14 are preferably of the same dimensions aside from their difference in thickness and are of arcuate form and made of asbestos molded or woven material. The pads are secured together to the sectors of the disk by hollow rivets 15 which are preferably slightly counter-sunk to avoid contact with the driving plates.

It is believed that the foregoing conveys a clear understanding of the objects prefaced above and while I have illustrated but a single working embodiment it should be understood that considerable change might be made in the design and arrangement of the parts without departing from the spirit and scope of the invention as expressed in the appended claims.

What I claim is:

1. A friction clutch disk having a plurality of friction pads of a certain thickness mounted at intervals on both faces of said disk, and a plurality of other friction pads of a different thickness mounted on both faces of said disk intermediate the first mentioned pads.

2. A friction clutch disk having a plurality of friction pads of a certain thickness mounted alternately on opposite faces of said disk, and a plurality of other friction pads of a different thickness mounted alternately on opposite faces of said disk intermediate the first mentioned pads so that the pads of one thickness occur on the opposite face of the disk from the pads of the other thickness.

3. A friction clutch disk having a plurality of friction pads mounted thereon and arranged to produce distortion of the disk as pressure is applied to said pads in opposite directions by pressure elements approaching from opposite sides of the disk, and means to engage one of the elements for limiting the extent of distortion of said disk.

4. A friction clutch disk having a plurality of friction pads of a certain thickness arranged on the opposite faces of said disk to distort said disk as pressure is applied to said pads in opposite directions, and a plurality of auxiliary pads of less thickness than the first mentioned pads arranged with respect to said first mentioned pads to limit the distortion of the plate.

5. In a clutch, the combination of a distortable driven element and a pair of driving elements arranged to apply pressure in opposite directions to said driven element for frictionally driving the same in distorted condition, the co-acting frictional engaging surfaces of said driving and driven elements being divided into two portions, namely a portion arranged to commence the distortion of said driven element and provide an initial light partial power take-up, and another portion which limits the extent to which said element can be distorted by the first portion and provides with the first portion on the full engagement of said elements a full and substantially complete power take-up.

6. In a clutch, the combination of a distortable driven element, and a driving element for distorting and frictionally driving said driven element, the co-acting frictional engaging surfaces of said elements being divided approximately into halves, approximately half of the surfaces being engaged to commence distortion of said driven element for an initial light partial power take-up and the other approximately half of the surfaces being engaged to finally limit the extent to which said element will be distorted and provide with the first approximately half of the surfaces on the full engagement of the elements a full and substantially complete power take-up.

7. A friction clutch disk having a plurality of radial slots therein entering from the periphery thereof dividing the rim of said disk into sectors, a relatively thick friction pad on one side of said disk on a sector and a relatively thin pad on the other side of the disk on the same sector, the next sector having the reverse arrangement of pads and so forth, so that alternate sectors have the same arrangement of pads and intermediate sectors a reverse arrangement of pads.

8. A friction clutch disk having a plurality of friction pads mounted in spaced relation thereon arranged to come first into frictional engagement with an adjacent surface and be in driving relation therewith by virtue of the distortion produced in the plate by said pads, and a plurality of auxiliary pads mounted on said plate between said first pads arranged to come into engagement with said surface after the first pads, and limit the extent to which said plate can be distorted.

9. A friction clutch disk having a plurality of relatively thick and thin friction pads mounted thereon, said thick pads being arranged to come first into frictional engagement with an adjacent surface and being in driving relation therewith by virtue of the distortion produced in the plate by said pads, and said thin pads being arranged to come next into engagement with said surface and limit the extent of possible distortion of said plate.

10. A friction clutch disk having annularly arranged friction material on the opposite faces thereof, the material being alternately thick and thin in section on both faces with the thick sections in line with the thin sections on the opposite face of the disk.

11. A friction clutch disk having a plurality of friction pads mounted thereon on opposite faces of said disk to produce distortion thereof as pressure is applied to said pads in opposite directions by pressure elements approaching from opposite sides of the disk, and a plurality of other pads mounted on said disk on the opposite face thereof from the friction pads so as to engage with the pressure elements and thereby limit the extent of distortion of said disk.

12. A friction clutch disk having frictional driving pads mounted thereon to produce distortion of segments of said disk as pressure is applied by pressure elements approaching from opposite sides of the disk and other pads mounted on said disk and arranged by engagement with said pressure elements to limit the extent of distortion of said disk.

In witness of the foregoing I affix my signature.

CARL RUESENBERG.